United States Patent [19]
Yamamoto

[11] 4,091,255
[45] May 23, 1978

[54] ELECTRODES IN WELDING MACHINES
[75] Inventor: Mamoru Yamamoto, Chofu, Japan
[73] Assignee: Sanki Kogyo Kabushiki Kaisha, Japan
[21] Appl. No.: 664,548
[22] Filed: Mar. 8, 1976
[30] Foreign Application Priority Data
Mar. 25, 1975 Japan .................................. 50-36162
[51] Int. Cl.² .............................................. B23K 11/06
[52] U.S. Cl. ...................................... 219/84; 219/119; 339/8 R
[58] Field of Search .......................... 219/84, 119, 120; 339/5 R, 5 M, 5 RL, 8 R, 8 P, 8 PB

[56] References Cited
U.S. PATENT DOCUMENTS

| 2,280,111 | 4/1942 | Widell | 219/84 X |
| 3,115,454 | 12/1963 | Robischung et al. | 219/84 X |
| 3,546,655 | 12/1970 | Tysver et al. | 339/8 R |

FOREIGN PATENT DOCUMENTS

| 2,303,166 | 8/1974 | Germany | 219/84 |

Primary Examiner—J. V. Truhe
Assistant Examiner—N. D. Herkamp
Attorney, Agent, or Firm—Shlesinger, Fitzsimmons & Shlesinger

[57] ABSTRACT

In electrodes for seam welding machines and the like, electric current paths from a transformer to an electrode shaft are established not as through an electrode frame, cover plate and others, but directly through contact means which is connected at one end thereof to the transformer and abuts at another end upon a free end of the electrode shaft coaxially thereof.

2 Claims, 5 Drawing Figures

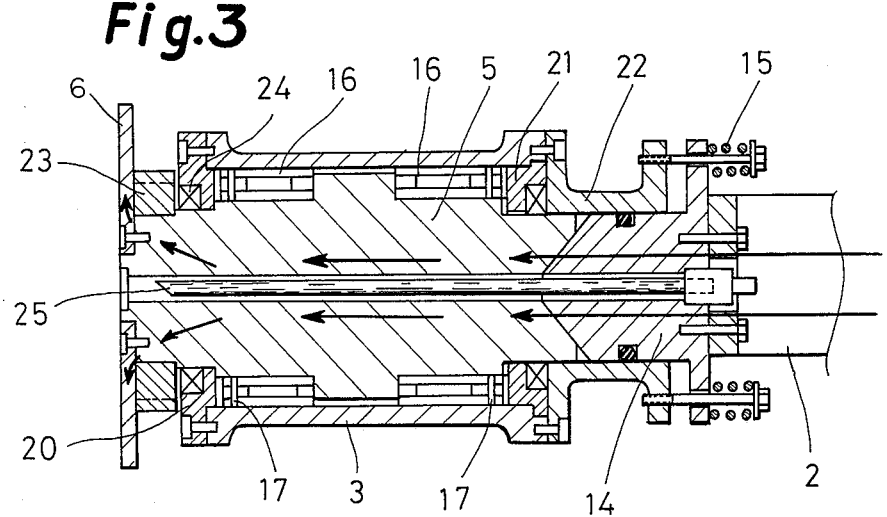
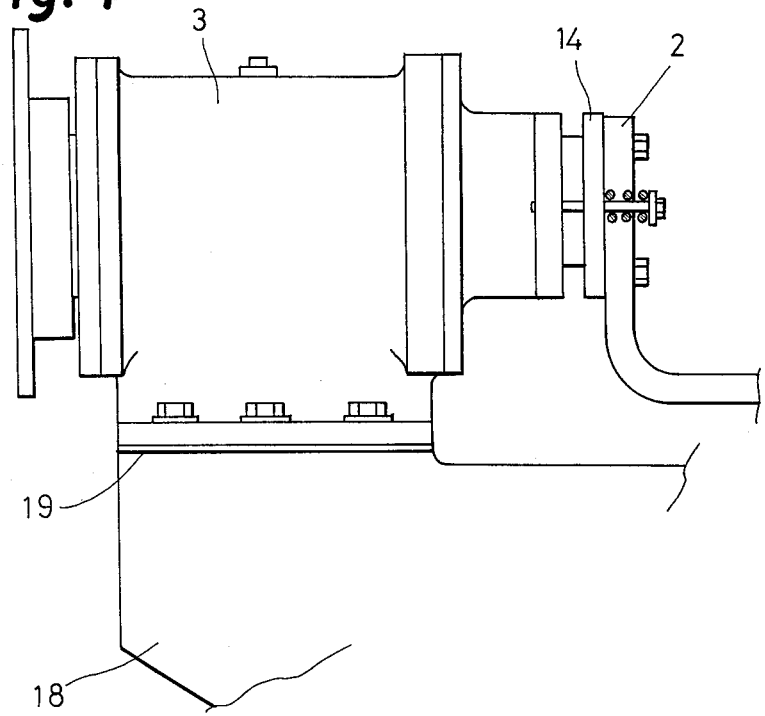

ELECTRODES IN WELDING MACHINES

This invention relates to a seam welding machine, and more particularly, it relates to electrodes advantageously employable in the seam welding machine and the like.

In seam welding which is a type of resistance weld, the electrodes are in the form of rollers which oppose each other on opposite sides of the work. Current is passed between the electrodes as the work moves along. The current to each such electrode is supplied from an electric source most conventionally through a secondary conductor connected to the electric source, a frame of the electrode, a cover plate of the frame, a brush or brushes, and a shaft of the electrode. Current flowing in such conventional arrangements is not stable electrically and mechanically, as will be explained more in detail in the following.

Hence, it is an object of this invention to provide an electrode in a seam welding machine and the like, which is electrically and mechanically stable.

In the accompanying drawing in which preferred embodiments of this invention are illustrated in comparison with a conventional electrode:

FIG. 3 is a cross sectional plan view of an electrode made in accordance with the present invention, wherein paths of current are indicated by arrows similarily to FIG. 2;

FIG. 4 is a side elevational view of the same shown in FIG. 3; and

Figure 1:
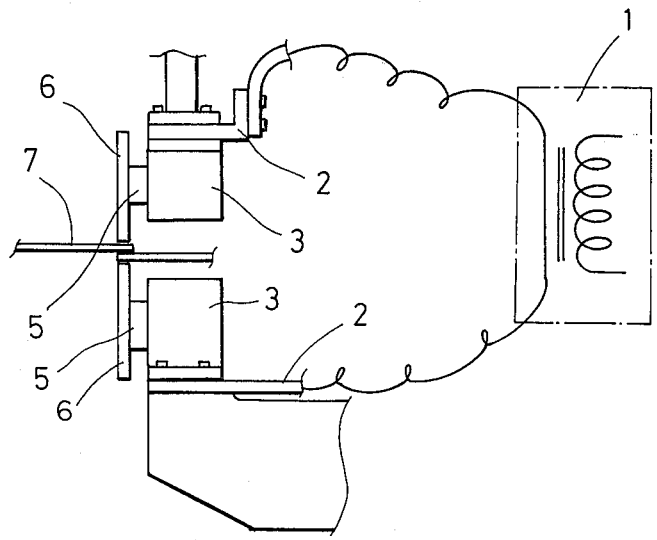
FIG. 1 is a schematic view of a seam welding machine in which the present invention is advantageously employable.
Figure 2:
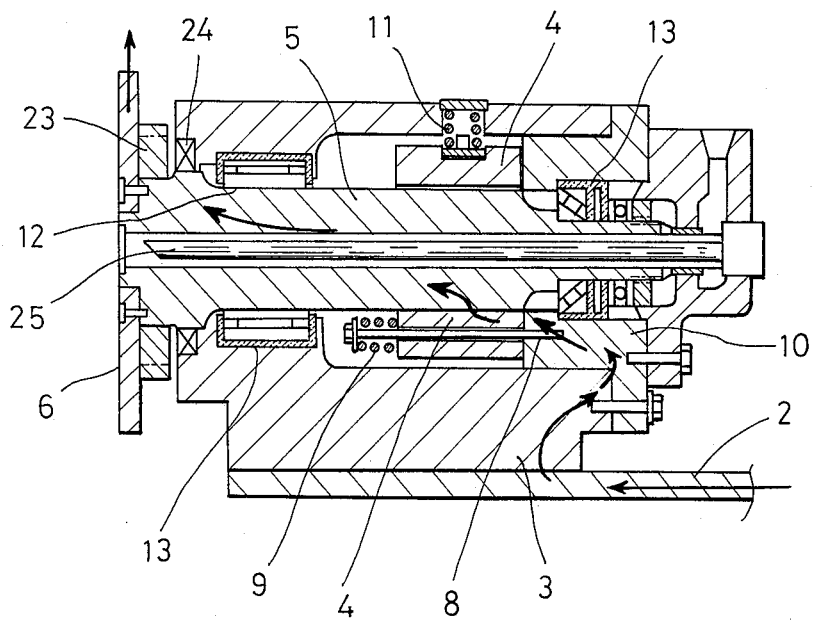
FIG. 2 is a vertical sectional view of a conventional electrode presently widely employed in such seam welding machine as illustrated in FIG. 1, wherein paths of electric current are indicated by arrows.

As described in the above preamble and as illustrated in FIG. 1, a seam welding machine of the kind mentioned above and related to this invention has a pair of electrodes in the form of rollers 6, 6 which are rotatable and oppose each other on opposite sides of the works 7 to be joined. The works are pressedly nipped between the electrodes which rotate and are supplied with current, whereby the works travel and are continuously joined to each other by means of heat produced by the electric resistance between the electrodes. Conventionally, as shown also in FIG. 2, each of the electrodes is supplied with electric current from a transformer 1 via a secondary conductor 2, an electrode frame 3, a brush 4, and an electrode shaft 5, to the rollers 6. To wit, with reference to said FIG. 2 in which only one of the electrodes is illustrated in order to simplify the description of construction thereof, the secondary conductor 2 is fixedly secured to the electrode frame 3, while the brush or brushes 4 (though only one of them is illustrated in the drawing) are urged at their lateral sides or ends against an inner surface or a cover plate 10, by means of a shaft 8 and spring 9. Said brush is pressed into contact also, axial inner along its bore or surface, with the electrode shaft 5, by means of another spring 11. Thereby, the electric current applied to the secondary conductor 2 from the transformer 1 flows, as indicated by arrows, to the frame 3, to cover plate 10, the brush 4, and the electrode shaft 5. The current further flows to the roller 6 which is fitted to the outer end of the shaft 5. In this arrangement, if an electric current flows through bearings 12 which support the electrode shaft 5 and are located between said shaft and the frame 3, sparks shall inevitably be produced in the bearings, whereby electric erosion caused by the sparks upon the bearings would bring about the uneven rotation of the shaft or finally stopping the rotation. In order to prevent such failures, insulators 13 are carefully mounted between the bearings 12 and the frame 3, as illustrated in FIG. 2. In addition, such conventional electrode arrangements are accompanied with various disadvantages such as mentioned in the following, since they are complicated in thier structures, and since they are unsatisfactory for devices in which their rotary shafts are applied with a comparatively large electric current and subjected to considerably large mechanical loads and shocks.

The disadvantageous points are enumerated hereinunder;

(1) Since the electric supply from the secondary conductor 2 to the electrode roller 6 has to be made via the frame 3, the cover plate 10, the brush 4, and the electrode shaft 5, structural arrangements become extremely complicated;

(2) While the secondary conductor 2, the frame 3 and the cover plate 10 are fixed to each other, and further while the electrode shaft 5 and the roller 6 are fixed to each other, the brush 4 is not stationary with respect to the cover plate 10 and the electrode shaft 5. To wit, as aforementioned, the said brush 4 abuts resiliently or movably against the electrode shaft 5 and the cover plate 10 at its inner peripheral surface and at its lateral side, being pressed by the spring 9 and 11. This means that as the abutting of said brush against the electrode shaft is frictional, the brush wears sometimes unevenly at its inner peripheral side, whereby its lateral contact with the cover plate 10 becomes consequently uneven and sparks produce thereabout, resulting in breakdown of the electrode as a whole. This kind of brush is not adequate for passing a comparatively large electric current therethrough, and in addition, it is not easy to maintain the desired brushing thereof and to discover the failure or breakdown operation in advance;

(3) The roller 6 is subjected to considerably large mechanical load and shock during rotation, and such load and shock are transmitted to the electrode shaft 5, bearings 12 and also to the insulators 13. These insulators are not always so strong that they can withstand the aforementioned load and shock, and thus become loose or break down. This kind of damage to the insulators 13 will bring about the uneven or inadequate electric contact of the brush with other parts of the electrode, and will bring about also undesirable electric current flow within the bearings, resulting in the occurrence of sparks thereabout and the subsequent breakdown thereof;

(4) As above-mentioned, electric paths within a conventional electrode of this kind are extremely unstable, and bearings thereof are not so strong. Therefore, the paths of electric current through the electrode become unstable, resulting in uneven joining of works.

Contrary to such conventional electrodes as mentioned above, the present invention eliminates all the aforementioned disadvantages. Now, with reference to FIGS. 3 and 4 in which one of the embodiments of this invention is illustrated and in which those parts corresponding to the parts in FIG. 2 are indicated by same numerals, the secondary conductor 2 which is resilient, contrary to such a solid conductor 2 as shown in FIG. 2, is fixed at its free end to contact means 14. This contact means 14, which has a conical head, is axially aligned with the electrode shaft 5, and frictionally abuts against an end of said shaft 5, being pressed thereagainst by a spring 15, and thereby being movable in its axial direction. In other words, in the present invention electrode, the flow of current from the secondary conductor 2 to the electrode is established by the frictional and coaxial abutting and sliding contact directly made between the electrode shaft 5 which is dynamic and the contact means 14, which is static. In this arrangement, as indicated by arrows in FIG. 3, electric current is directly applied to the electrode shaft 5, contrary to the arragements illustrated in FIG. 2 in which the electric current flow is inevitably to be made via the frame 3, cover plate 10, and brush 4, and in which case the electric current passing through the shaft has to be insulated from the frame by the insulators 13, 13.

It shall be noted that as the electrode frame 3 does not constitute an electric path in this invention, there is no chance that electric current flows through bearings 16 and thrust bearings 17, and consequently there is no need of insulating them. In order to avoid the possible grounding of the electrode and subsequent current flow through the bearings 16, 17, the electrode frame 3 may be insulated from an arm 18 of the welding machine, as shown in FIG. 4, by means of an insulator plate 19 provided therebetween. By this most simple insulation, the electric failure of the bearings 16, 17 is totally preventable, and there is no fear at all that the bearings 16, 16 shall be damaged by metallic powders producible by electric erosion thereof. It shall be noted also that while the shaft 5 is circumferentially supported by the bearings 16, 16, there are additionally provided in this invention the thrust bearings or blocks 17, 17 so that the shaft can effectively withstand the load axially applied thereto. Since said thrust bearings 17, 17 are pressedly supported either by a front cover plate 20, which is fixed to the frame 3 by bolts, or by a rear cover plate 21, which is fixed also to the said frame by a tubular guide 22 for the contact means 14, the electrode shaft 5 is positively and firmly supported against any load or shock which would be applied thereto through the associated roller 6 either in its axial or lateral direction.

It shall be further noted that as the tubular guide 22 keeps the electrode shaft 5 and the contact means 14 aligned coaxially with each other, and as said coaxial alignment of shaft 5 and contact means 14 produces a constant sliding and rotary contact therebetween, which becomes closer as each wears, the electric flow between the contact means 14 and the shaft 5 is most stable. In addition, the contact pressure therebetween can easily be adjusted by the spring 15 and be properly maintained, because the said spring is located outside of the frame, which is associated contrary to the conventional electrodes in which the brushes and pressure adjusting spring are mostly housed inside the frames.

In FIGS. 2 and 3, numerals 23, 24 and 25 respectively indicate gearings, oil seals and cooling water pipes.

Figure 5:
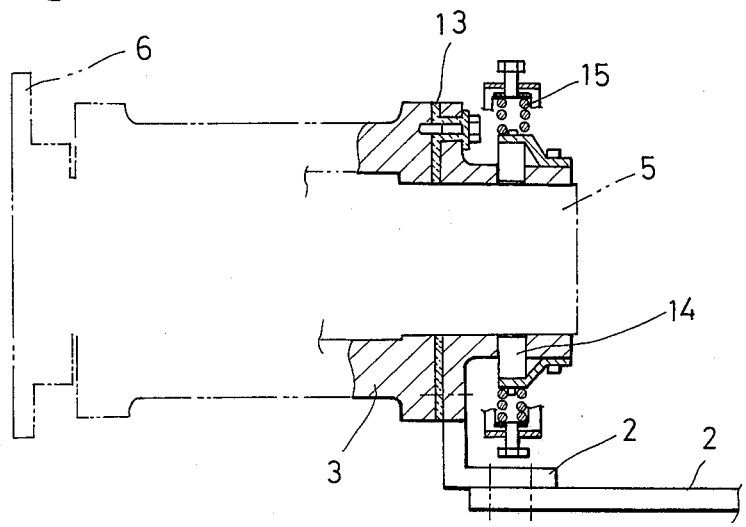
FIG. 5 is another embodiment of electrode made in accordance with this invention, in which only its main parts are shown in section.

The electrode which is illustrated in FIG. 5 as another embodiment of this invention, has structural and working principles similar to the one shown in FIGS. 3 and 4, especially with respect to the points that the current from the secondary conductor 2 is directly passed to the shaft 5 by means of the contact means 14 and without the intervention of the frame 3, that the contact pressure of said means 14 upon the shaft 5 is readily adjustable and maintainable exteriorly, of the frame 3, and further that the insulation of bearings is not needed.

Improvements given by this invention are briefed hereinunder, in comparison with conventional ones.

(1) As the frame 3 is not utilized as a path of electric current, but instead the current is applied directly to the electrode shaft in this invention, mechanical and electrical features of the invention are simplified and maintenance thereof is easy on account of its uncomplicated internal construction;

(2) As the bearings shall not be charged with electric current, it is not necessary to have them insulated and consequently they can be made strong enough;

(3) Compared to conventional electrodes in which brushes wear rapidly and adversely to the normal operation of the electrode because the brushes contact with shafts circumferentially and intermediately, the contact between the electrode shaft and the contact means in the present invention is made by the abutment between them at their free ends, and preferably coaxially as shown in the first embodiment of the invention. Such abutment which preferably corresponds to not less than the traverse cross sectional area of the shaft, becomes closer as they wear, and can have a sufficient contact surface area by making it conical;

(4) Compared to conventional brushes 4 as illustrated in FIG. 2 which are pressed by those springs which are not easily adjustable because of being housed within frames, and which have to be of comparatively small resilient forces having no reserve because of being located in small dimensional spaces within the frames, the spring means 15 in this invention, which press the contact means 14 against the shafts 5, are easily adjustable and have sufficient reserve adjustment;

(5) Compared to conventional electrodes in which bearings 12 have to be insulated from frames and which are consequently made weak against lateral pressures, the present invention electrode shafts can be made readily to resist lateral pressures and loads given in either directions;

(6) As the frame 3 is not utilized as a path of current in the present invention, it can be made from comparatively cheap materials which are not necessarily good electric conductors but may be non-magnetic;

(7) Compared to those electric paths in conventional electrodes, which have rather circuitous routes, which are not stable electrically, and which consequently often produce the breakdown of electrodes, the electric paths of the present invention are most stable and can give constant electric currents for excellent welding;

(8) In conventional electrodes, though a plurality of brushes are employed, electric currents tend to flow through the shortest path and tend to concentrate to pass through only the brush which is most nearly located to the secondary conductor 2, whereby breakdown of the electrodes are sometimes caused. In the present invention, such breakdown do not occur because electric currents are transferred directly from the contact means 14 to the shaft 5; and (9) In the present invention, as there is no electrical sliding contact of the shaft with its bearings, metallic powders on account of such sliding wear or electric erosion will not be produced, whereby the shaft would not be damaged thereby.

It shall be now apparent that as explained and described in the foregoing, the present invention can achieve most advantageously the aforementioned object.

What is claimed is:

1. An electrode mechanism for a seam welding machine and the like, comprising a frame, an electrode shaft rotatably mounted in said frame and having a curvilinear contact surface on one end thereof, an electrode roller fixed to the opposite end of said shaft and projecting outside of the frame, contact means secured against rotation on said frame and abutting against the contact surface on said shaft at said one end thereof, a resilient conductor adapted to be connected at one end thereof to an electric source and connected at another end thereof to the aforementioned contact means, said contact means comprising a cylindrical contact member having on one end a curvilinear contact surface complimentary to, and slidably abutted by, said contact surface on said one end of said shaft coaxially thereof, and the abutting contact surfaces establishing a direct electric current path between the resilient conductor and the electrode shaft, means adjustable at the exterior of said frame to adjust the contact force between the complimentary contact surfaces on said shaft and said member, respectively, and means supporting the adjacent ends of said shaft and said member around their circumferenes thereby to maintain said member in coaxial alignment with said shaft.

2. An electrode mechanism as defined in claim 1, wherein said supporting means comprises a sleeve secured at one end to said frame and surrounding the adjacent ends of said shaft and said cylindrical member coaxially thereof, and said means for adjusting said contact force comprises a plurality of spaced adjusting elements connecting said sleeve to said cylindrical member and arranged circumferentially around the outside of said abutting contact surfaces thereby to allow maximum surface contact between said member and the electrical conductor attached thereto.

* * * * *